Feb. 26, 1929. 1,703,539

M. P. OHLSEN

SOIL PULVERIZING MACHINE

Filed April 14, 1927

Inventor
Mark P. Ohlsen
By
Attorneys

Patented Feb. 26, 1929.

1,703,539

UNITED STATES PATENT OFFICE.

MARK P. OHLSEN, OF BRILLION, WISCONSIN, ASSIGNOR TO BRILLION IRON WORKS, OF BRILLION, WISCONSIN.

SOIL-PULVERIZING MACHINE.

Application filed April 14, 1927. Serial No. 183,697.

This invention relates to soil pulverizing machines and is particularly adapted to a rotary hoe for use with such machines.

This invention is an improvement over that disclosed in Patent No. 1,179,388 of April 18, 1916, to H. Ariens for a ground pulverizer.

Objects of this invention are to provide a novel form of soil pulverizing machine in which a plurality of rotary hoe wheels are employed and are so constructed that they will project into the ground in a substantially vertical direction during penetration and will thereafter under hang and lift a portion of the ground as they leave the ground, so that the ground is thoroughly spaded and broken up, and to provide a machine which will pulverize the ground to a material depth and thus leave a blanket of packet pulverized soil, so that the moisture in the lower portion of the ground will be effective and also so that the ground is properly aerated.

Further objects are to provide a novel form of rotary wheel for ground pulverizers which is so constructed that it has a spading or hoeing action, and which nevertheless may be interchanged with standard wheels so that it may be employed upon machines already on the market.

An embodiment of the invention is shown in the accompanying drawings in which.

Figure 1:
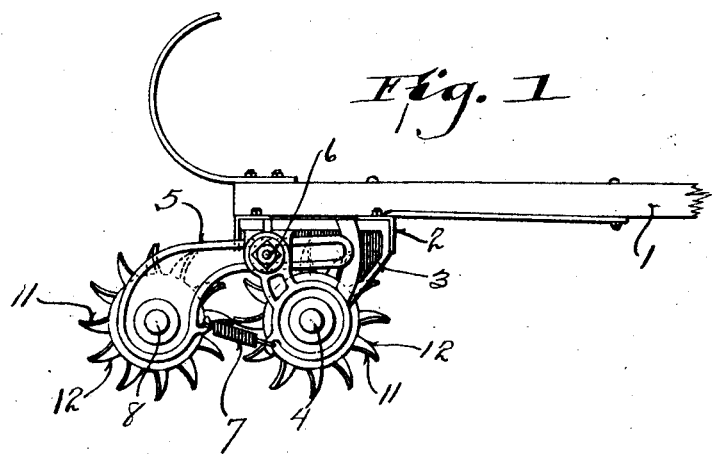
Figure 1 is a side view partly broken away of the machine with the wheels in place.

Referring to the drawings, it will be seen that a pulverizing machine has been shown of the general type illustrated in the above identified patent. The machine comprises a draft bar or tongue 1, which is attached to a frame 2 provided with side members 3. These side members carry a transverse shaft 4 upon which the rotary wheels are mounted. Further, it is to be noted that the machine is provided with a pair of rearwardly projecting downwardly curved arms 5 pivoted by means of the bolts 6 and urged downwardly and forwardly by means of the springs 7. These rearwardly extending arms carry a rear transverse shaft 8 upon which a series of wheels are also mounted, as in the above identified patent.

Figure 3:
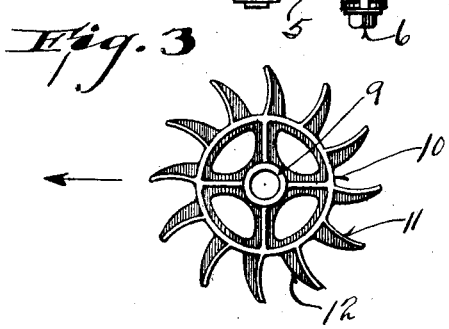
Figure 3 is a view of the wheel separate from the machine.

Referring particularly to Figure 3, it will be seen that the wheels each comprise a hub portion 9 adapted for positioning upon the transverse shaft and equipped with a circular flange 10. From this body portion, a plurality of curved hoe teeth or spading teeth 11 project. These teeth are formed with relatively wide, smooth faces which are curved, as may be readily seen from Figures 1 and 3, and which are reenforced by rear webs 12. The entire wheel is formed integral, although if desired the body portion may be made of cast iron and the teeth of steel.

It is to be noted particularly that the teeth are so curved and positioned upon the body portion of the wheel that as they are presented towards the ground they will enter the ground vertically, but as they leave the ground, due to their peculiar shape they will spade or hoe the ground as the teeth will underhang a portion thereof and thus lift it upwardly as the wheels rotate.

Thus, a very effective breaking and spading action occurs as the wheels are drawn over the ground. The cylindrical or circular portion 10 limits the depth to which the wheels will dig into the ground and thus an accurate gauge is secured for the depth of the spading or hoeing.

Further, the wheels are adapted to loosely turn upon their respective shafts and consequently they may independently turn to the exact extent required, and may thus accomplish the spading with the minimum drag upon the machine, and also in the most effective manner.

Figure 2:
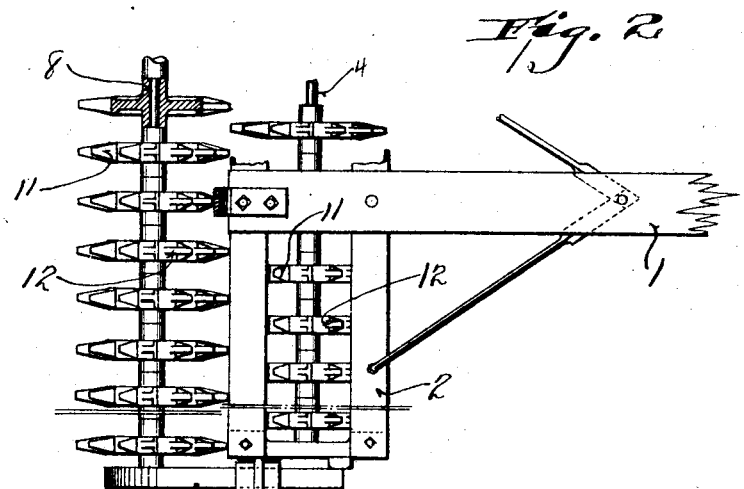
Figure 2 is a fragmentary plan view of the structure shown in Figure 1.

The rear series of wheels are arranged in staggered relation, as may be seen from Figure 2, with reference to the front series of wheels. This rear series of wheels may be either in the form shown or else may be plain round packers of the conventional type. They are adapted to further pulverize the soil by breaking up any chunks that may be lifted and left by the forward row of wheels.

It will be seen therefore that a novel form of soil pulverizing machine has been provided in which a very definite spading or hoeing action takes place as the machine is drawn over the ground.

Further, it will be seen that the wheels are no more expensive to manufacture than the former well-known types, and yet they give a great deal better spading or breaking action than any of the wheels heretofore employed.

Although the invention has been described in considerable detail, such description is intended as illustrative rather than limiting as the invention may be variously embodied and as the scope of such invention is to be determined as claimed.

I claim:

1. A soil pulverizing machine adapted to be drawn over the ground and comprising, a frame, a fixed transverse shaft carried by the frame, a plurality of spaced spading wheels loosely mounted upon said shaft for supporting said frame, each wheel comprising a hub, a circular ground engaging flange carried by said hub, and a plurality of radially disposed and rearwardly curved teeth projecting from said flange, said hubs being elongated, whereby an open, free space is left between adjacent wheels.

2. A soil pulverizing machine adapted to be drawn over the ground and comprising, a frame, a fixed transverse shaft carried by the frame, and a plurality of spaced spading wheels loosely mounted upon said shaft for supporting said frame, each of said wheels comprising a hub, a ground engaging flange carried by the hub, and a plurality of spaced radial and rearwardly curved teeth projecting from said flange, the base of said teeth being of a width substantially the same as said flange, and tapering to a point at their outer extremities, the faces of said teeth being transversely flat, said wheels being spaced apart to leave an open space between wheels from adjacent the shaft to adjacent the other edges of the teeth.

3. A soil pulverizing machine adapted to be drawn over the ground and comprising a frame, a fixed transverse shaft carried by the frame and a plurality of spaced spading wheels loosely mounted upon said shaft for supporting said frame, each of said wheels comprising an elongated hub adapted to abut the hub of the adjacent wheel, a relatively narrow circular ground engaging flange carried by the hub, and a plurality of radially spaced and rearwardly curved teeth carried by said flange, the base of said teeth being of substantially the same width as that of said flange, said teeth gradually tapering to a point at their outer extremities, their faces being transversely flat, and their bases and outer ends being in substantially radial alinement with the axis of said wheels, said wheels having a reinforcing web located on the opposite side of each tooth from that of its transverse flat face.

In testimony that I claim the foregoing I have hereunto set my hand at Brillion in the county of Calumet and State of Wisconsin.

MARK P. OHLSEN.